July 14, 1959  E. G. JOHNSON  2,895,098
AUTO PILOT SERVOSYSTEM
Filed Dec. 12, 1956
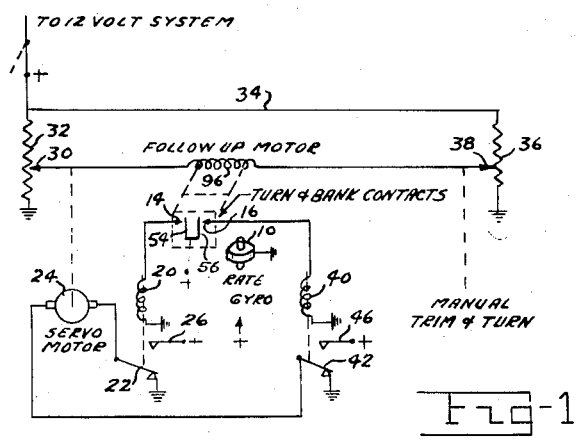
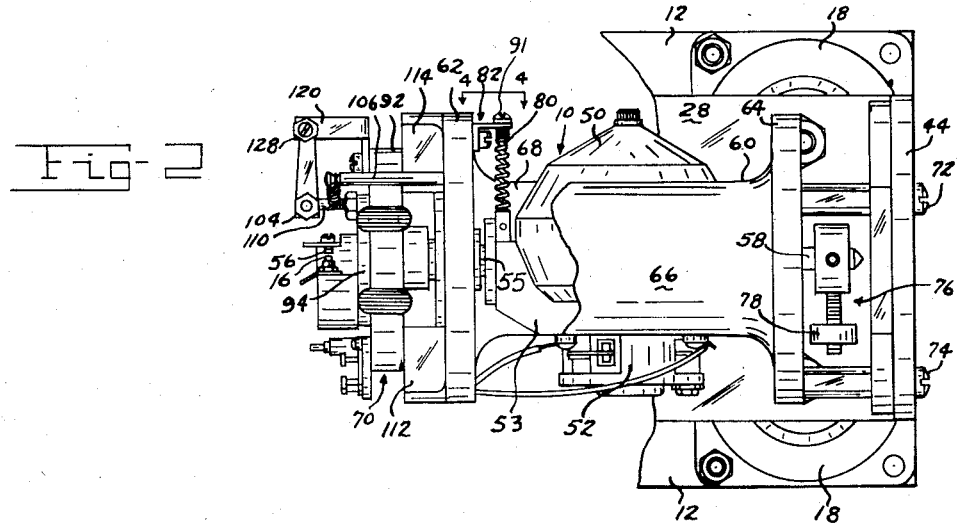
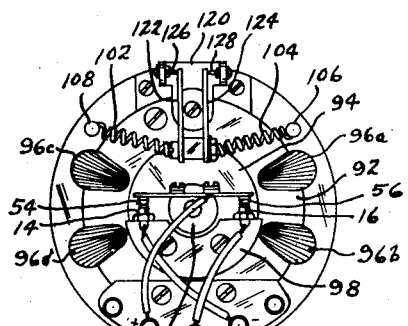
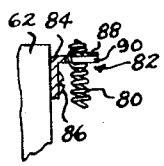
INVENTOR.
EDWARD G. JOHNSON
BY *Milton E. Gilbert*
His ATTORNEY

United States Patent Office 2,895,098
Patented July 14, 1959

2,895,098
AUTO PILOT SERVOSYSTEM

Edward G. Johnson, Shiloh, Ohio, assignor to Globe Industries, Inc., Dayton, Ohio, a corporation of Ohio Application December 12, 1956, Serial No. 627,758

6 Claims. (Cl. 318—489)

This invention is concerned with a single axis autopilot and is more particularly concerned with the application of an autopilot to the control surfaces of an aircraft.

It is well known that airplanes, during flight, have a tendency to roll and yaw. If, for example, the right wing drops so that the right wing is lower than the left wing, the airplane will turn to the right. Slight adjustment of the rudder to the left to prevent this will cause the airplane to slip, so that the dihedral effect will raise the wing, as would adjustment of the left aileron. In some airplanes, this interaction between roll and yaw has led to the use of an elastic connection between the ailerons and the rudder.

It is one object of this invention to provide an autopilot that will automatically straighten the plane by applying a corrective movement to the rudder and also possibly to the proper aileron, the autopilot operating to actuate the rudder and aileron into home position as soon as the airplane has again been stabilized. A further object of the invention is to provide a single axis autopilot having maximum utility, dependability and safety in an automatic pilot system at minimal cost.

Further objects and advantages will become readily apparent from a reading of the description following hereinafter, and from an examination of the drawings, in which:

Figure 1 is a simplified schematic wiring diagram of the single axis autopilot of the invention, Figure 2 is a side elevation view of the gyroscope and follow-up motor, partially broken away to show the construction in greater detail, Figure 3 is an end view of the gyroscope, and Figure 4 is a sectional view taken along line 4—4 of Figure 2.

The autopilot of the invention employs two extremely small direct-current servo-motors, which have proven very satisfactory in the miniature D.C. motor field. One of these motors is employed to power a rate gyro. When the gyro moves, due to a turn, a pair of contacts positioned by the gyro serve to energize servo-motor relays, which actuate a servo-motor to cause the control surface to move. Motion of the servo moves a wiper on a first servo-potentiometer, which unbalances an electrical bridge whose output energizes a follow up or torque motor. The resulting motion of the torque or follow up motor repositions the contacts in such a manner as to remove the signal to the servo-relay. This extremely simple follow up system eliminates the complexity and lack of flexibility inherent in mechanical follow-ups.

The servo-motor output is coupled to an output pulley by means of a friction clutch which is manually engaged. The control of this clutch mechanism by the pilot plus the slip possibilities provided by such a clutch, insure the safety of the installation. Also, the clutch may be released by movement of an operating handle. The main off-on switch may be mounted on the control panel of the airplane to provide easy access and operation of the instrument. A balance potentiometer serves as the other half of the follow up bridge and is used to trim out a turn, or it can be used automatically to turn the airplane as desired through the autopilot, when the autopilot is engaged.

The component parts of the electrical circuit are shown schematically in Figure 1, in a simplified form. Number 10 indicates a rate gyroscope, one end of the mounting shaft of which carries a pair of contacts 54 and 56. A pair of contacts 14 and 16 are mounted in juxtaposition to the contacts 54 and 56. The rate gyroscope therefore moves the contact 54 into engagement with the contact 14 or else moves the contact 56 into engagement with the contact 16, as the case may be. The contacts are connected to a suitable source of electrical energy, as for example, a 12 volt direct-current system. Thus, when the contact 54 engages the contact 14, a relay 20 is energized to close the switch 22 by engaging the contact 26, thus energizing the servo-motor 24 and causing it to rotate in one direction.

When the contact 56 is engaged with the contact 16, a relay 40 is energized to close a switch 42, by engaging the contact 46. In the latter event, the movable contact element of the switch 22 is grounded, so as to close the circuit through the servo-motor 24. However, the current flows through the servo-motor in the opposite direction, thereby reversing the direction of rotation of the servo-motor. The servo-motor 24 is preferably provided with permanently magnetized poles, and operates at high speeds. This permits the use of a very lightweight motor developing a large torque through a suitable planetary gear reducing mechanism.

The servo-motor 24, when rotating in one direction, actuates a sliding contact 30 in one direction of the potentiometer 32, and when it rotates in the opposite direction, actuates the sliding contact 30 in the opposite direction on the potentiometer 32. This potentiometer 32 is connected in parallel with another potentiometer 36, so as to form what may be referred to as a "normally balanced circuit" which includes the two potentiometers, the lead 34 and the windings 96 of a torque or follow-up motor. This balanced circuit has one terminal connected to the 12 volt system and the other terminals grounded, as shown. When the circuit is balanced, no current flows through the follow up motor windings 96, i.e., the voltage drop between the source of electrical energy and the contact 30 is equal to the voltage drop of that portion of the potentiometer 36 located between the 12 volt system and the contact 38.

Thus, there is zero voltage across the windings 96 of the follow up motor. Whenever the contact 30 is moved, the circuit becomes unbalanced and the current flows through the windings 96 either to the left or to the right, as is shown in Figure 1, depending upon the polarity of the voltages supplied to the windings 96. Whenever a current flows through a follow up motor, the movable contacts 14 and 16 are shifted towards a neutral position out of contact with the contacts 54 or 56, depending upon the direction of flow of current through the windings 96. The follow up motor actuates the contacts 14 and 16 away from the contact 54 or 56, as the case may be, to deenergize the servo-motor 24. The operation of the servo-motor 24 and the contacts 14 and 16 is described more fully hereinafter.

The balanced circuit may also be unbalanced manually by actuating a manual trim and turn knob on the instrument board (not shown), thus actuating the movable contact 38 of the potentiometer 36. By thus actuating the manual trim and turn knob in one direction the contact 38 is actuated upwardly, as viewed in Figure 1, so as to decrease the resistance between the 12 volt system and the movable contact 38, or by turning the manual trim knob in the opposite direction, the movable contact 38 may be adjusted downwardly, so as to increase the resistance between the 12 volt system and movable contact 38.

Referring to Figures 2 and 3, the gyroscope and follow up motor, etc. are mounted upon a bracket 28 having an upturned flange 44, the bracket being in turn mounted upon a base plate 12 by means of shock absorbing mounts 18. The gyroscope 10 is used to sense deviations of the airplane from flight path and includes the rotatable bell 50 housing a gyromotor (not shown); the end bell of the motor being shown at 52. The gimbal 53 is provided with shafts 55 and 58 protruding therefrom. The gimbal is mounted in a frame 60 that includes a pair of circular end sectors 62 and 64, joined by a pair of arcuate cylindrical sectors 66 and 68. One end sector 64 is provided with a central aperture, whereas the other end sector 62 is provided with a radial slot terminating in an enlarged central aperture. Outer races of circular bearings may be positioned within the apertures of the end sectors 62 and 64 and the shafts 55 and 58 are respectively positioned therethrough. By this arrangement, it is possible to use a frame 60, wherein the side portions 66 and 68, and the end sectors 62 and 64 consist of a single part which may be formed as a die casting, for example. The gimbal is assembled into the frame 60 by first inserting the shaft 58 through the end sector 64 and then positioning the shaft 56 within the slot in the end sector 62. The bearings may then be slipped in from the outer ends over the ends of the shaft, so as to journal the gimbal in the frame.

The frame 60 is mounted on the bracket 28, i.e., affixed to the upstanding flange 44 by means such as shown at 72 and 74. The shaft 58 is properly balanced by means 76, which may consist of a hub affixed to the shaft 58 and provided with adjustable counter-weights 78. The gimbal 53 is also provided with a restraining spring 80 which is affixed at one end to the gimbal 53 and adjustably affixed at the other end through a mounting means 82. As more clearly shown in Figure 4, the mounting means 82 comprises a bracket 84 which is affixed to the end sector 62 by a fastener 86. The leg of the bracket 84 which extends away from the sector 62 is U-shaped, providing an aperture 90. A retaining plate 88 is positioned over the outwardly extending U-shaped leg of the bracket 84 and affixed to the end portions of the U thereof by screws 91 (one of which is shown in Figure 2). In order to adjust the tension of the spring 80 the screws 91 are loosened and the plate 88 separated from the bracket 84. The spring 80 may then be extended to any desired position, and the plate 88 again reassembled on the bracket 84, thus retaining the spring 80 in position by clamping individual coils thereof.

The follow up motor 70 is mounted around the end of the shaft 55, and consists of a stator 92 and a rotor 94. As shown in Figure 3 the follow up motor winding consists of a plurality of coils 96a, 96b, 96c, and 96d. These coils are wound upon portions of a soft iron ring to form the stator 92. The magnetized rotor 94 has mounted thereon a sector of non-magnetic material 98, which carries the contacts 14 and 16. The contacts 54 and 56 are juxtaposed to the contacts 14 and 16 respectively. These contacts 54 and 56 are mounted on a non-magnetic hub 100 which is affixed at the outer end of the gimbal shaft 55.

A pair of balancing springs 102 and 104 maintain the rotor 94 in neutral position so that the pairs of contacts 14, 54 and 16, 56 are normally held out of contact. The frame end sector 62 has a pair of posts 106 and 108 affixed thereto. The springs 102 and 104 are affixed at their outer ends to the posts 108 and 106, respectively. The inner ends of the springs 102 and 104 are affixed to a post 110 which is mounted on the rotor 94 of the follow up motor. In an alternate embodiment a single spring may be used instead of the springs 102 and 104, with the central portion of this spring wrapped around the post 110. When the plane is maintained on a straight course, the field windings 96a, etc. are de-energized, and the contacts 14, 54 and 15, 56 are separated. The stator 92 is fixedly attached in any suitable manner to the end sector 62, and spaced therefrom by spacer members 112 and 114. The windings 96a, b, c and d correspond to the winding 96 shown schematically in Figure 1. These coils are connected in any suitable manner into the balanced circuit. They may be connected in series or in parallel, or in series-parallel relationship. The coils 96a, b, c and d are wound so as to have a cumulative effect, that, is when the current flows in one direction through the follow up winding 96, a torque is applied to move the rotor clockwise or counter-clockwise. The springs 102 and 104 exert a bias upon the rotor 94 always tending to center the rotor so as to position the contacts 14 and 16 in a spaced relationship from the contacts 54 and 56. This biasing effect is counteracted by the torque on the rotor 94 when the current flows into the follow up motor coils. As soon as the coils 96a, b, c and d are de-energized, the springs 102 and 104 again center the contacts 14 and 16.

The servo-motor 24, rotates at a very high rate of speed, probably on the order of 12,000 r.p.m. or higher. It is geared down through a planetary gear system, so that the output shaft rotates at a very slow speed, i.e., creeps. In addition to reducing the speed, this planetary gear system has several advantages. One is that a very small motor, rotating at a very high speed, is capable of developing a very large torque at the output shaft. Furthermore, when the servo-motor is de-energized and stops, the output shaft is held in position, in that any force applied to the output shaft will not rotate the motor. By this arrangement, the output shaft remains in this position until the servo-motor is again energized so as to prevent creeping of the rudder from an adjusted position. Thus, any air pressure applied to the rudder has no effect thereon. The only adjustment of the rudder that can be made when the single axis autopilot disclosed herein is used, is made solely by the servo-motor 24.

In certain types of aircraft large movements of the rudder are necessary in order to sufficiently change the course of the airplane to bring it quickly into the desired path of flight. The system that has been described up to this point operates in a manner to provide a series of small rudder adjustments which are sufficient in the maneuvering of certain types of aircraft. As indicated previously, when it is desired to employ the autopilot of the invention on aircraft requiring large rudder adjustments to effect the desired straightening of the airplane, it is necessary to prevent the rotor of the follow up motor from operating to separate the contacts 14, 54 or 16, 56, to discontinue actuation of the servo-motor. Thus, when a wide turn is indicated by the gyro to be necessary to straighten the flight of the aircraft, the appropriate set of contacts will be maintained in contact to allow the servo-motor to operate and crank the rudder to the desired position before the contacts can be separated. The means to accomplish this wide rudder movement comprises a substantially U-shaped bracket 120 and a pair of metallic reeds or flat spring elements 122 and 124. The bracket 120 is mounted, at the base, of the U, on the stator 92 of the follow up motor. The reeds 122 and 124 are mounted on the stud 110, and thus affixed to the rotor 94 of the follow up motor. Adjustable stop screws 126 and 128 are mounted one on each of the legs of the U of the bracket 120. These stop screws serve to provide the point at which the reeds function to prevent the follow up motor from operating to separate the contacts. The operation of this portion of the autopilot will be discussed more fully hereinafter.

When the airplane is on a straight flight path the bridge circuit is balanced so that no current flows through the coils 96 of the follow up motor. The balancing springs 102 and 104 maintain the contacts in neutral position so that neither pair of contacts 14, 54 or 16, 56 are in engagement. Assuming now that the airplane turns to the right, and in view of the fact that the gyro moves about its pivot shafts 55 and 58, the contact 54 will come into engagement with the contact 14. The relay 20 will then be energized so as to close the switch 22, thereby energizing the servo-motor 24 in one direction. As soon as the servo-motor 24 is energized, the rudder is moved to the left, thereby tending to straighten the airplane, which will re-position the gyro towards neutral position. At the same time that the servo-motor is actuated, the contact 30 is actuated, so as to unbalance the bridge circuit, thus causing a current to flow through the windings 96 of the follow up motor, applying a torque to the rotor 94 to drive the contact 14 out of engagement with the contact 54. Since the springs 102 and 104 are biasing the contacts 14, 16, the torque or follow up motor must work against these springs, the energy supplied by the torque motor being proportional to the deflection required to separate the contacts 14 and 54. The energy supplied to the torque motor is determined by the position of the wiper 30 and therefore by the position of the control surface, since both the wiper 30 and the control surface are driven by the servo-motor 24. Thus, the position of the control surface is determined by the deflection of the contacts 54, 56; which is essentially the deflection of the gyro with respect to the rate of turn of the aircraft. It is thus clear that the correction applied to the control surface is proportional to the rate of turn of the aircraft.

Where small degrees of turn are involved, the deflection of the rotor 94 of the follow up motor will be such that the reeds 122 or 124 will not contact the stop screw 126 or 128, respectively. The operation of the follow up motor will separate the pair of contacts which are in engagement before a reed will strike its stop screw. However, where large degrees of turn are required, the gyro will deflect the contacts 54, 56 to a greater extent, and assuming, as indicated above, that the airplane turns to the right, the contacts 54, 14 will be in engagement. Accordingly the follow up motor will be energized with a greater amount of energy, thus actuating the rotor and the reed 122 into position wherein the end of the reed contacts the stop screw 126. At this point, in order for the rotor of the follow up motor to rotate further it must overcome not only the energy of the spring 104 but also the spring force of the reed 122. The system is so designed that the energy generated by the follow up motor is insufficient to do this. Thus the contact 14 will not be moved out of engagement with the contact 54, thereby permitting the servo-motor to remain energized and to continue cranking the control surface to correct for the degree of turn.

As the airplane turns back to its desired course of flight, the gyro returns towards its normal position, thus re-positioning the contacts 54, 56. As soon as this occurs, the contacts 54 will become disengaged from the contact 14, and the servo-motor 24 will become de-energized. However, due to the unbalanced condition of the circuit, the follow up motor remains energized, thereby holding the contacts 14 and 16 in an off-center position. As the airplane approaches zero rate of turn, the contacts 14 and 16 being away from their normal center position and in the situation indicated above, will be positioned so that the contact 16 will be engaged by the contact 56 (which is now re-positioned by the gyro), thereby energizing the relay 40, closing the switch 42 to energize the servo-motor 24 in the opposite direction. This servo-motor now rotates in the direction which is opposite to the previous direction of rotation, thereby actuating the rudder into its normal home position and actuating the contact 30 into a balanced position to de-energize the follow up motor, i.e., the windings 96a, b, c and d. As soon as the windings of the follow up motor are de-energized, the spring 102 and 104 will aid in shifting the rotor and the contacts 14 and 16 into neutral position. When this is accomplished the airplane is flying on the desired course, the servo-motor is de-energized, the circuit is balanced and the airplane will continue on its course until it encounters another deviation from its course, in which event the operation described above will be repeated.

The operation described above refers to a turning of the airplane due to atmospheric disturbances resulting in unintended deviations from a straight flight course. However, if desired, the airplane can be caused to fly in a curved path. This may be accomplished through the autopilot by actuating a manual trim and turn knob (indicated schematically in Figure 1), so as to actuate the movable contact 38 upwardly or downwardly, thereby unbalancing the circuit. As the circuit is unbalanced, the follow up motor is energized to apply a torque to the rotor 94 in a clockwise or counterclockwise direction, as the case may be. Assuming that it is desired to veer to the left, the rotor is then shifted slightly in a counterclockwise direction, as viewed in Figure 3. In so doing, the contact 14 comes into engagement with the contact 54, thereby energizing the servo-motor 24 to actuate the rudder towards the left. The movable contact 30 will also be adjusted to move the contact 54 out of engagement with the contact 14; but not far enough to balance the circuit so as to hold the airplane on the curved course until the manual trim and control knob is adjusted to home position.

In the event the airplane encounters atmospheric disturbances while it is following a curved path as selected by the manual control knob, the contacts 54 or 56 will again engage one of the contacts 14 or 16, resulting in the servo-motor making a correction of the rudder and at the same time maintain the circuit unbalanced. Thereby the energization of the stator field windings 96a, b, c and d are changed to prevent over-throw by causing the contacts 14 or 16, as the case may be, to move out of engagement with the movable contacts 54 or 56; the airplane thus returning to its proper curved path of flight.

Although one preferred embodiment of the invention has been described, it will be readily understood that various changes may be made in the apparatus which do not depart from the scope of the invention as set forth in the appended claims.

What I claim is:

1. In a single axis autopilot for a craft including a servo-motor, a follow-up motor, a rate gyro and an electrical circuit including said motors, and a normally balanced bridge portion having a variable potentiometer; pairs of juxtaposed contact means, the first pair of contacts being mounted so as to be positioned by said rate gyro and the second pair of contacts being mounted so as to be positioned by said follow-up motor, means for biasing said second pair of contacts into neutral position out of contact with the first pair of contacts, whereby when said craft turns from a predetermined course the first pair of contacts are positioned so that one of its contacts engages the juxtaposed contact of the second pair of contacts energizing the servo-motor to move a control surface of the craft into position to return the craft to the predetermined course and to adjust the variable potentiometer so as to unbalance the bridge portion, thereby energizing the follow-up motor to re-position the second pair of contacts into neutral position and de-energizing the servo-motor so as to retain the control surface in its new position.

2. The autopilot of claim 1 wherein said rate gyro includes a gimbal having a mounting shaft, the rotor of the follow-up motor being rotatably mounted on said shaft, the first set of contacts being affixed to said shaft and the second set of contacts being mounted on the aforesaid rotor.

3. In a single axis autopilot for a craft including a servo-motor, a follow-up motor, a rate gyro and an electrical circuit including said motors, and a normally balanced bridge portion having a variable potentiometer; pairs of juxtaposed contact means, the first pair of contacts being mounted so as to be positioned by said rate gyro and the second pair of contacts being mounted so as to be positioned by said follow-up motor, resilient means for biasing said second pair of contacts into neutral position out of contact with the first pair of contacts whereby when said craft turns from a predetermined course the first pair of contacts are positioned so that one of its contacts engages the juxtaposed contact of the second pair of contacts energizing the servo-motor to move a control surface of the craft into position to return the craft to the predetermined course and to adjust the variable potentiometer so as to unbalance the bridge portion, thereby energizing the follow-up motor and a second adjustably engageable resilient means positioned by said follow-up motor for additionally loading said second pair of contacts and so constructed and arranged that the follow-up motor cannot overcome the force of the second resilient means when in engagement and cannot reposition the second pair of contacts into neutral position until the craft has appreciably returned to the predetermined course and the gyro disengages the second resilient means.

4. The autopilot of claim 3 wherein said rate gyro includes a gimbal having a mounting shaft, the rotor of the follow-up motor being rotatably mounted on said shaft, the first set of contacts being affixed to said shaft and the second set of contacts being mounted on the aforesaid rotor.

5. The autopilot of claim 4 wherein the second resilient means comprises a pair of elongated flexible members fixedly mounted at one end on the follow-up rotor and adjustable stop means mounted in opposed relationship to the other ends of the members.

6. In a single axis autopilot for a craft including in combination: a servo-motor, a follow-up motor, an electrical circuit including said motors, a rate gyro so interconnected into said circuit and so constructed and arranged that when said craft turns from a predetermined course the gyro acts to energize both of said motors until the craft has appreciably returned to the predetermined course, said rate gyro assembly including a gimbal and mounting frame, means for restraining said gimbal comprising a U-shaped bracket affixed to said frame, a retaining member releasably affixed astride the legs of the bracket and a resilient member fixed at one end to the gimbal and clamped at its other end between the retaining member and bracket.

References Cited in the file of this patent
UNITED STATES PATENTS

| | | |
|---|---|---|
| 2,487,793 | Esval et al. | Nov. 15, 1949 |
| 2,499,664 | Meredith | Mar. 7, 1950 |
| 2,687,647 | Asworth et al. | Aug. 31, 1954 |
| 2,740,299 | Jewell | Apr. 3, 1956 |